United States Patent
Kirshtein

(10) Patent No.: US 7,062,596 B2
(45) Date of Patent: Jun. 13, 2006

(54) SELF-SYNCHRONIZING HALF DUPLEX MATRIX SWITCH

(75) Inventor: Philip M. Kirshtein, New Market, AL (US)

(73) Assignee: Avocent Corporation, Huntsville, AL (US)

(*) Notice: Subject to any disclaimer, the term of this patent is extended or adjusted under 35 U.S.C. 154(b) by 131 days.

(21) Appl. No.: 10/223,678

(22) Filed: Aug. 20, 2002

(65) Prior Publication Data

US 2003/0041209 A1 Feb. 27, 2003

Related U.S. Application Data

(60) Provisional application No. 60/313,825, filed on Aug. 22, 2001.

(51) Int. Cl.
G06F 13/00 (2006.01)
G06F 13/12 (2006.01)
G06F 13/38 (2006.01)
G06F 13/42 (2006.01)

(52) U.S. Cl. .................. 710/316; 710/62; 710/72; 710/106; 710/300; 710/317

(58) Field of Classification Search ................ 709/208; 710/8, 104, 110, 313, 316–317, 62, 72, 106, 710/300

See application file for complete search history.

(56) References Cited

U.S. PATENT DOCUMENTS

| | | | | |
|---|---|---|---|---|
| 4,885,718 A | * | 12/1989 | Asprey et al. | 710/300 |
| 5,579,308 A | * | 11/1996 | Humpleman | 370/352 |
| 5,689,713 A | * | 11/1997 | Normoyle et al. | 710/263 |
| 5,991,296 A | * | 11/1999 | Mu et al. | 370/380 |
| 6,014,040 A | | 1/2000 | Tracy | |
| 6,078,974 A | * | 6/2000 | Kirshtein | 710/305 |
| 6,138,185 A | * | 10/2000 | Nelson et al. | 710/33 |
| 6,150,997 A | * | 11/2000 | Asprey | 345/2.1 |
| 6,185,643 B1 | * | 2/2001 | Kirshtein et al. | 710/73 |
| 6,265,951 B1 | * | 7/2001 | Kirshtein | 333/28 R |
| 6,324,605 B1 | * | 11/2001 | Rafferty et al. | 710/100 |
| 6,385,666 B1 | * | 5/2002 | Thornton et al. | 710/2 |
| 6,549,966 B1 | * | 4/2003 | Dickens et al. | 710/300 |
| 6,708,247 B1 | * | 3/2004 | Barret et al. | 710/313 |
| 6,735,658 B1 | * | 5/2004 | Thornton | 710/305 |
| 6,779,071 B1 | * | 8/2004 | Kallat et al. | 710/317 |

FOREIGN PATENT DOCUMENTS

| | | | |
|---|---|---|---|
| EP | 1237294 A1 | * | 9/2002 |
| GB | 2350212 A | * | 11/2000 |
| WO | WO 03019760 A2 | * | 3/2003 |

* cited by examiner

OTHER PUBLICATIONS

'data link' in "Microsoft Press Computer Dictionary". Second Edition. Microsoft Press. 1994. p. 108.*

Primary Examiner—Rehanna Perveen
Assistant Examiner—Thomas J. Cleary
(74) Attorney, Agent, or Firm—Davidson Berquist Jackson & Gowdey, LLP

(57) ABSTRACT

A datalink for a system of N computers, and M monitors and peripheral devices is described. Separate state machines are provided for each switched computer, and separate state machines for each switched workstation, with a non-intrusive matrix switch disposed there-between. The matrix switch routes the peripheral data streams without intercepting them with a processor. The computer-side state machines and the workstation-side state machines are in a master/slave relationship, respectively, and communicate peripheral data using a half-duplex method of transfer.

7 Claims, 2 Drawing Sheets

SELF-SYNCHRONIZING HALF DUPLEX MATRIX SWITCH

CROSS-REFERENCES TO RELATED APPLICATIONS

This application claims the benefit of U.S. Provisional Patent Application Ser. No. 60/313,825, filed Aug. 22, 2001, the entire content of which is herein incorporated by reference.

STATEMENT REGARDING FEDERALLY SPONSORED RESEARCH OR DEVELOPMENT (NOT APPLICABLE)

BRIEF SUMMARY OF THE INVENTION

This application relates to an extension system for connecting a computer at a first site to peripherals at a second site and, more specifically, to switching between plural computers and plural peripherals.

Presently, to switch peripheral data from multiple workstations to multiple computers, switch topologies employ processor-based switches to receive, interpret and switch the peripheral data traffic. Methods of switching, compensating, and transmitting those signals are known, as for example described in: U.S. Pat. No. 6,078,974 issued Jun. 20, 2000 to Kirshtein; U.S. Pat. No. 6,150,997 issued Nov. 21, 2000 to Asprey; U.S. Pat. No. 6,185,643 issued Feb. 6, 2001 to Kirshtein et al.; and U.S. Pat. No. 6,265,951 issued Jul. 24, 2001 to Kirshtein, all of which are incorporated herein by reference. But, in extension technologies, the present inventors have discovered that non-intrusive switching may be performed by providing separate state machines for each switched computer, and separate state machines for each switched workstation, with a non-intrusive matrix switch there-between.

In the presently preferred embodiment, a matrix switch routes the peripheral data streams without intercepting them by a processor. This switch may be implemented within existing high speed master/slave datalink, such as those manufactured by Avocent of Huntsville, Ala.

The matrix switch contains a state machine for each of N attached master connections. These state machines synchronize to the packet frames from the master source and control the data direction of the master and slave transceivers based on the fixed frame and packet lengths, as defined in a physical protocol. Each state machine may extract one bit of information from its master source and apply that bit to a synchronous receiver. A single processor in the switch services the N asynchronous receivers and controls the connection of slave sources to master sources, and video paths based on the control information received from the downstream sources. Alternatively, the matrix switch may be controlled by a central control processor and receiver control information via a LAN or other communications interface.

As described in the distributed (not central control processor) topology above, the master end must always be the user (downstream) end in order to extract control information, this is a blocking, non-companion topology. By making the master and slave ends of the datalink swap under software control, between receivers and transmitters, and by adding additional state machines for the upstream (previously slave) connections and a shared datalink interface at the matrix switch, a non-blocking "companion" distributed topology may be implemented.

BACKGROUND OF THE INVENTION

A personal computer is typically coupled to peripherals that serve as computer-user interfaces. Such peripherals may include a keyboard, a mouse, and a monitor. Typically standard cables connecting each peripheral are around four feet long. Because of the characteristics of the connecting cables and their interfaces, the cables do not provide a reliable peripheral connection when they are much longer than twenty feet.

There are situations where it is desirable to separate the computer from the peripherals at distances much greater than allowed by typical standard peripheral cables. The apparatus to extend the distance between a computer and peripherals is called an extender or an extension system. In existing extenders, standard coaxial cables, shielded cables, and unshielded cables serve as communication channels. In addition, custom cables have been developed to provide an improved communication channel for some extender systems. The cables connecting the computer to the peripherals may be confined in a binder or may be separate cables for each of the desired connections. The apparatus or electronic boxes connected to the ends of each cable serve as interfaces between the computer and the cable at one end and the peripherals and the cable at the other end.

DETAILED DESCRIPTION OF THE INVENTION

Figure 1:
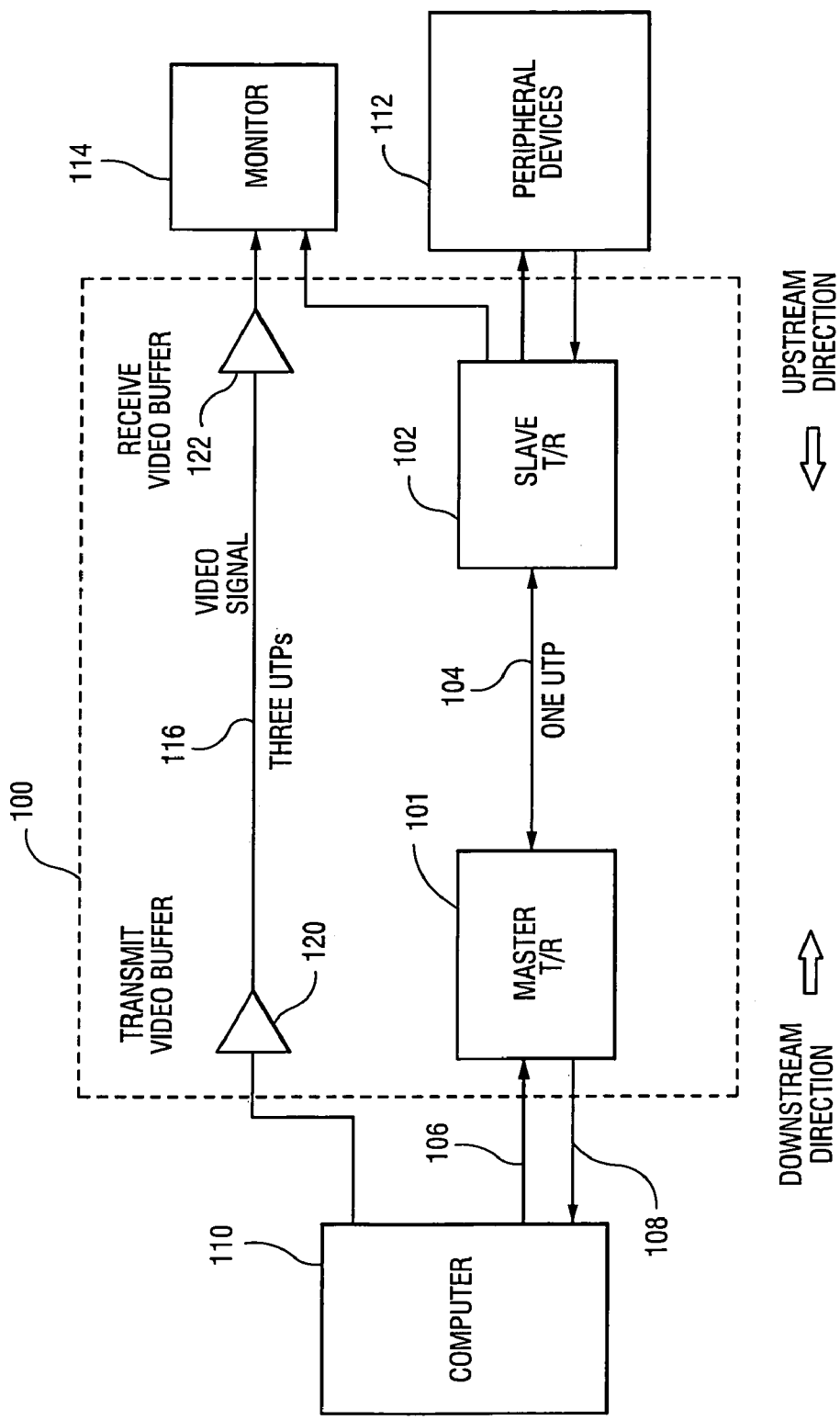
FIG. 1 is a block diagram illustrating a computer coupled to peripherals via an extension system in accordance with the present invention.

FIG. 1 illustrates a prior art extension system 100, such as more specifically described in U.S. Pat. No. 6,185,643 (incorporated herein by reference). The extension system has a master transmitter and receiver ("T/R") 101 and a slave T/R 102 coupled by one unshielded twisted pair ("UTP") 104. To couple video between a computer 110 and a monitor 114, three UTPs, 116 are used to transfer red, green, and blue video signals. The peripheral devices 112 include at least a mouse and a keyboard. Information or data going from the computer 110 to the peripheral devices 112 is going in the downstream direction and going in the upstream direction when going from the peripherals to the computer. The three UTPs 116 coupling the computer to the video monitor 114, typically would have a master video buffer 120 and a slave video buffer 122. These video buffers are located in the master T/R 101 and the slave T/R 102, but are shown as separate elements for clarity. Although UTPs are used to couple the master T/R 101 and the slave T/R 102 shielded pairs, coaxial cables, and other known cables could provide a communication channel. The one UTP 104 is also used to furnish DC power to the slave T/R 102 from the master T/R 101. A DC power supply located (not shown) in the master T/R is coupled to the one UTP using typical inductive coupling. The slave T/R 102 has an inductive coupling for receiving the DC power. Those persons skilled in the art could determine the levels of voltages required to provide the necessary DC voltage levels at each end of the power providing arrangement. Further common mode signaling is provided by the one UTP 104 for transferring a video horizontal sync signal.

Although the three UTPs 116 serve as a video channel for video signals from the computer as shown in FIG. 1, other arrangements may be used to transfer video signals. The other arrangements may include, for example a coaxial cable or a custom designed cable which may serve as video channels for the video signals from the computer. Horizontal sync signals and vertical sync signals may be sent using the one unshielded twisted pair 104 while R, G, and B are transferred downstream by separate video channels. A plurality of peripheral information can be transmitted in both the downstream and the upstream directions.

There are many occasions where it is necessary route analog VGA video, mouse, and keyboard signals between one of a plurality of computers and one or more monitor, mouse, and keyboard by switching equipment.

Referring again to FIG. 1, the prior art master T/R 101 has interface circuits connecting the master T/R to the computer 110. The interface circuits provide a coupling between peripherals and appropriate codecs. Downstream peripheral information in the present invention include mouse data, mouse clock, keyboard data, keyboard clock, and video sync signals. The mouse and keyboard require an open collector connection and the video sync signals may require sync and polarity detectors. The required interface circuits are well known to those skilled in computer design. The interface circuits, in the downstream direction, provide peripheral information to an encoder/multiplexer. The encoder and multiplexer arrange the peripheral information into a packet, which is transmitted in the downstream direction using UTP 104. Upstream information from the peripherals is decoded and demultiplexed to obtain peripheral data, which is then distributed to the computer.

Similarly, slave T/R 102 is coupled to the peripheral devices 112 through interface circuits. The interface circuits couple upstream peripheral information to an encoder/multiplexer. The encoder and multiplexer arrange the upstream peripheral information in a packet which is transmitted to the master T/R 101 after a predetermined time upon receiving a sync signal from the master T/R. After the slave T/R 102 has transmitted the upstream peripheral information, the slave T/R waits for the next sync and downstream peripheral information. When the slave communication T/R receives downstream peripheral information the decoder and demultiplexer disassemble the packets received and forward the information to the peripheral devices. The elements of the master T/R and the slave T/R are nearly identical. A person knowing the functionality of the both devices could build the devices.

The UTP 104 serving as the communication channel in the present invention can be one pair in a Category 5 cable. Category 5 cable is standard cable designed for use in local area networks. An example packet structure containing both downstream and upstream peripheral information can contain 16-bits. Each bit represents peripheral information such as keyboard data, keyboard clock, mouse data, mouse clock, etc.—or is reserved for later use. For one use of the invention, bit 0 represented audio 15, one bit of a 16 bit digital representation of an audio signal. Audio 15 through Audio 8 is represented by bits 8 through 15. Audio 15 was first sent as bit 0 in order to scale a D/A converter in the slave T/R 102. Bits 5 and 6 are modem information, but may be used for other async data. A reserved bit, bit 7, may be used for a future peripheral device. Packets alternate, going downstream, then upstream in a typical half duplex fashion. Four successive packets provide the data for the right and left audio channel. In addition serial control signals are multiplexed over four successive packets. The packet transfer method as described provides 16 channels of 187,500 bits per second in each direction.

To illustrate example timing, the master T/R 101 sends downstream the first packet containing computer information being sent to the peripherals, at time zero. At a short time later the slave T/R 102 receives the packet. When the slave T/R receives the packet a counter is started and at some later predetermined time, the slave T/R transmits a packet in the upstream direction. When the master T/R 101 receives the packet, then peripheral information is sent to the computer. Then after a period of time the master T/R sends its next packet. The half duplex method of peripheral information transfer continues as determined by the application requirements.

Figure 2:
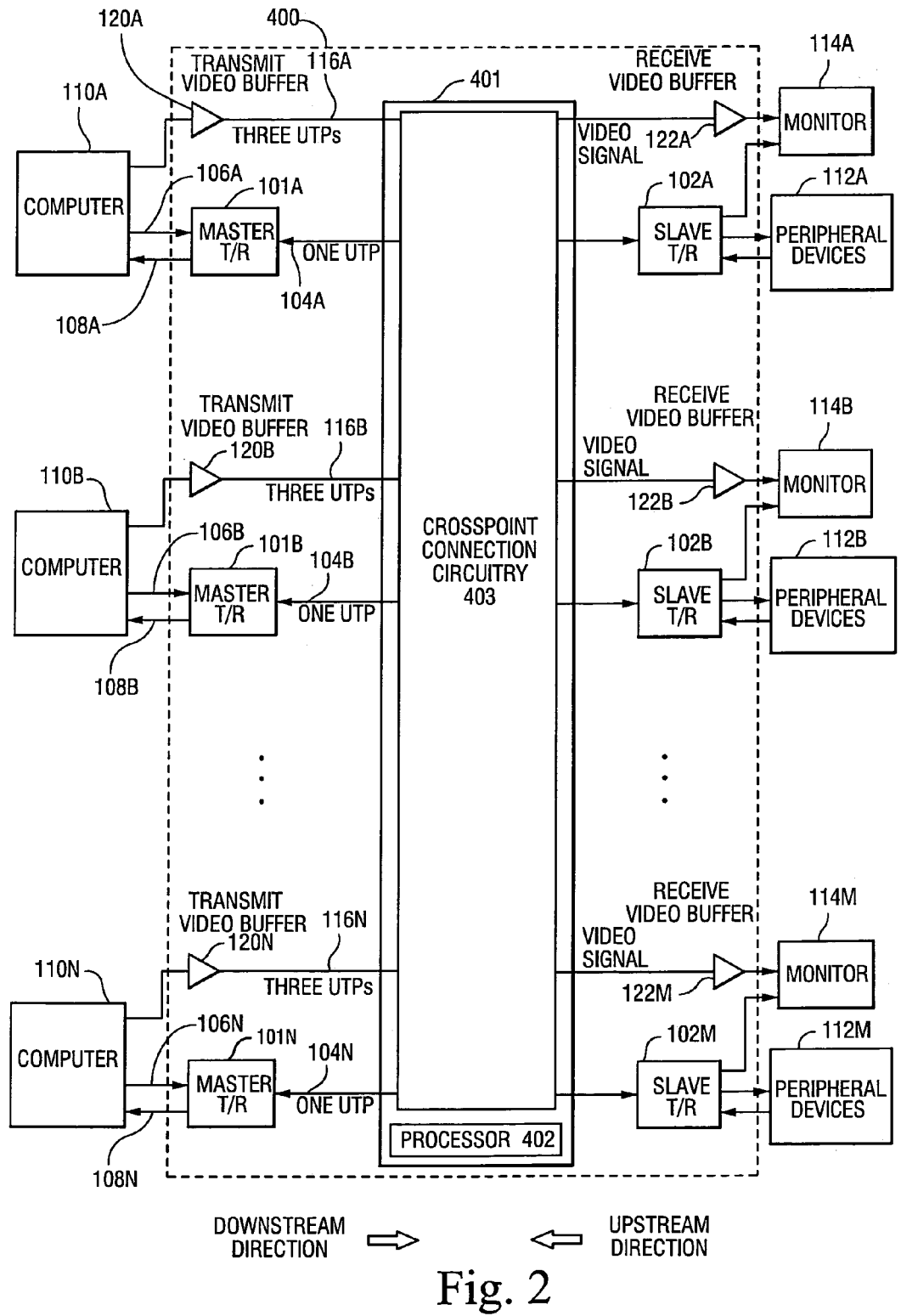
FIG. 2 is a block diagram the presently-preferred embodiment of the invention.

As shown in FIG. 2, a plurality of computers 110A–N are available for communication with a plurality of peripheral devices 112A–M and monitors 114A–114M. Between the computers 110 and peripheral devices/monitors 112, 114 are corresponding master state machines 101A–101N and slave state devices 102A–102M. Meanwhile, the video information from the computers 110A–N are transmitted to monitors 114A–114M via transmit video buffers 120A–N on the computer side and 122A–M on the peripheral side.

As can be seen from FIG. 2, the operation of the computers 110, master state machines 101, video transmit buffers 120, video receive buffers 122, and slave state machines 102 are substantially the same as described above with respect to FIG. 1. As in FIG. 1, the computer side is defined as the downstream side and the peripheral side is defined as the upstream side.

In the embodiment of FIG. 2, a matrix switch 401 is interjected between the multiple master state machines 101A–N and the multiple slave state machines 102A–M. The matrix switch 401 may be independent of the master and slave state machines (i.e., connected by appropriate cabling) or may be part of a more comprehensive extension system 400. The matrix switch 401 receives the video and packet data bits from the video transmit buffers 120 and master state machines 101, respectively, for each of the computers 110A–N on the downstream side and video receive buffers 122 and slave state machines 102 on the upstream peripheral side. As described previously with respect to FIG. 1, the master state machines 101 connect to the computers 110 in a one-to-one correspondence such that each computer 110 has a corresponding master state machine 101. Similarly, on the peripheral side, each of the peripheral devices 112A–M has a corresponding slave state machine 102A–M, again in one-to-one correspondence. As the artisan will understand from the variables employed in FIG. 2, the number of computers employed and the number of peripherals employed in connection with the present extension system 400 is not limited, but is determined by the capacity of the N by M crosspoint connection circuitry 403. The crosspoint connection circuitry 403 establishes low impedance and/or logical paths between the master state machines 101A–N and the slave state machines 102A–M under the control of a processor 402. Notably, the processor 402 is not in the direct path of the crosspoint connections (i.e., the low impedance paths) established by the processor 402 between the master state machines 101 and slave state machines 102. As a result, no processor intercedes in the transmission of data bits from the master state machines 101 and the slave state machines 102. Unlike the embodiment of FIG. 1, the master state machines 101 synchronize to the packet frames from the computers 110A–N and control the data direction of the master and slave state machines based on the fixed frame and packet lengths. Each state machine may extract one bit of information from its corresponding computer and apply that bit to a synchronous slave device connected to it by the crosspoint connection circuitry 403. The result is a non-blocking data link in which the master and slave ends swap data under software control without intervening processing.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A datalink for operatively linking one or more computers to one or more computer peripheral devices and monitors remotely located from said one or more computers, the datalink comprising:

a plurality of master state devices, each including a master transceiver for operatively linking one of said computers to the datalink, and each constructed and adapted to receive a stream of computer data packets from a computer connected thereto, to sample the computer data packets into a stream of consecutive computer samples, and to load the consecutive computer samples, sample-by-sample, into a stream of master frames, one sample per master frame;

one or more slave state devices, each including a slave transceiver for operatively linking one or more peripheral devices to the datalink, and each constructed and adapted to receive one or more streams of peripheral data packets from peripheral devices connected thereto, to sample the peripheral data packets into one or more streams of consecutive peripheral samples, and to load said peripheral samples into a stream of slave frames; and a matrix switch including:

cross-point connection circuitry providing switchable paths between selected master state devices and selected one or more slave state devices; and a processor, out of the switchable paths, controlling the establishment of said switchable paths, wherein each said master state device is further constructed and adapted to send as a downstream transmission a master frame in its stream of master frames to a slave transceiver connected thereto via a datalink path, to be decoded at the slave transceiver connected thereto into a stream of computer data packets and, wherein each slave state device is further constructed and adapted to send as an upstream transmission a slave frame in its stream of slave frames to a master transceiver connected thereto via a path in the datalink, said one of the slave frames to be decoded at the master transceiver connected thereto into streams of peripheral data packets, said selected master state devices self-synchronizing communications with said selected one or more slave state devices independently of each other's downstream transmissions of available computer data bits and awaiting receipt of upstream transmissions of corresponding available peripheral data bits.

2. The datalink of claim 1, wherein the streams of peripheral data packets includes one from the group consisting of: mouse data, mouse clock, keyboard data and keyboard clock.

3. The datalink of claim 2 wherein at least one of the streams of peripheral data packets further includes asynchronous data.

4. A datalink as in claim 1 wherein the one or more computer peripheral devices comprise a keyboard and a mouse.

5. A method, in a system comprising a datalink for operatively linking one or more computers to one or more computer peripheral devices remotely located from said one or more computers, the datalink having (a) a plurality of master state devices; (b) one or more slave state devices, and (c) a matrix switch with: (c1) cross-point connection circuitry providing switchable paths between selected master state devices and selected one or more slave state devices; and (c2) a processor, out of the switchable paths, controlling the establishment of said switchable paths, the method comprising:

forming, in said datalink, a first path between a first computer and a first peripheral device, each operatively connected to the datalink, and forming, in said datalink, a second path between a second computer and a second peripheral device, each operatively connected to the datalink;

receiving, in a master state device corresponding to a first on of the computers, a first stream of computer data from said first computer, sampling the first stream of computer data into a first stream of computer data samples, and framing the first stream of computer data samples into first computer-side frames;

receiving, in a slave state device corresponding to a first one of the computer peripheral devices, a first stream of peripheral device data from said first peripheral device, sampling the first peripheral device data into a first stream of peripheral data samples, and loading at least some of the first stream of peripheral data samples into a first peripheral-side frame;

receiving, in another master state device corresponding to a second one of the computers, a second stream of computer data from said second computer, sampling second first stream of computer data into a second stream of computer data samples, and framing the second stream of computer data samples into second computer-side frames;

receiving, in another slave state device corresponding to a second one of the computer peripheral devices, a second stream of peripheral device data from said second peripheral device, sampling the second peripheral device data into a second stream of peripheral data samples, and loading at least some of the second stream of peripheral data samples into a second-peripheral-side frame;

sending, via the first path, the first peripheral-side frame upstream to the first computer and the first computer-side frames downstream to the first peripheral device; and sending, via the second path, the second peripheral-side frame upstream to the second computer and the second computer-side frames downstream to the second peripheral device;

self-synchronizing communications between said first and second computers and said first and second computer peripheral devices, respectively, by cueing, independently of each other, downstream transmissions of computer data and, independently of each other, awaiting receipt of upstream transmission of peripheral data.

6. A method as in claim 5, wherein the first and second streams of peripheral data includes one from the group consisting of: mouse data, mouse clock, keyboard data and keyboard clock.

7. A method as in claim 5, wherein the first and second peripheral devices are selected from the group consisting of: mouse and keyboard.

* * * * *